United States Patent Office 3,463,756
Patented Aug. 26, 1969

3,463,756
VINYL CHLORIDE RESINS STABILIZED WITH ZINC OXIDE AND AN ORGANIC COMPOUND
Robert Charnier and Francois Muller, Saint-Auban, France, assignors to Produits Chimiques Pechiney-Saint-Gobain, Neuilly-sur-Seine, France
No Drawing. Filed Feb. 16, 1967, Ser. No. 616,468
Claims priority, application France, Feb. 22, 1966, 50,607
Int. Cl. C08f 45/56, 45/60
U.S. Cl. 260—45.75        5 Claims

ABSTRACT OF THE DISCLOSURE

This invention is addressed to the stabilization of vinyl chloride polymers and copolymers to heat and light by the combination to include a stabilization system formulated of zinc oxide and an organic compound of the type urea, thiourea, biurea and biuret in amounts within the range of 0.1% to 2% by weight.

---

This invention relates to the thermal stabilization of polymers and/or copolymers of vinyl chloride and it relates more particularly to the thermal stabilization of vinyl chloride polymers and/or copolymers by the addition of a combination of ingredients and to a new and improved thermally stable product formed thereof.

Vinyl chloride polymers and/or copolymers are readily degraded by heat and/or light and the plastics industry has experimented with a large variety of materials with a view towards improving the light and/or thermal stabilization of such polymers.

Various commercial materials have been proposed for use as "stabilizers," but the term is deceiving in that such materials have been incapable of the desired results or are otherwise erratic in their behavior. Such stabilizers have been derived from many different groups of chemical compounds, the diversity of which gives indication of their lack of predictability in effect. For example, it is known to make use of substituted and unsubstituted amines, but the results are not predictable and often insufficient.

Metal ions in the presence of oxidants accelerate the decomposition of polyvinyl chlorides but the degradation mechanism is not known and the means for stabilization also remain unknown.

It is an object of this invention to produce and to provide a composition and method for producing heat and/or light stable polymers and/or copolymers of vinyl chloride and it is a related object to provide means for achieving such stabilization even in the presence of metal ions and oxidants in the polymer or copolymer.

The desired stabilization effect is achieved, in accordance with the practice of this invention, by the combination with the polymer or copolymer of vinyl chloride or mixtures thereof to include a stabilization system, alone or in addition to other of the conventional additives employed, in which the stabilization system is composed of zinc oxide and an organic compound having the general formula $$X-NH-\underset{\underset{Z}{\|}}{C}-NH-Y$$

in which X and Y may be the same or different and in which X and Y is a group selected of hydrogen —$CONH_2$, NH—CO—$NH_2$ or —NH—NH—CO—$NH_2$ and in which Z is an atom such as oxygen or sulphur.

The components in the stabilization system may be present in the ratio of 5–95% by weight and preferably 40–80% by weight of the organic compound with the remainder to 100% being made up of zinc oxide or 95–5% by weight and preferably 60–20% by weight of zinc oxide. The desired stabilization effect is experienced when the described stabilization system is employed in an amount within the range of 0.1% to 2.0% by wigeht of the polymer or copolymer or mixture containing same and it is preferred to make use of the stabilization system in an amount of about 1% by weight.

It has been discovered, much to our surprise, that the stabilization effect of the combined system is greater than the sum of the stabilization effect secured by its individual components when used alone.

The mixture of materials making up the stabilization system can be introduced during the polymerization or copolymerization of the vinyl chloride or into the previously formed polymer or copolymer or mixtures thereof. In the event of emulsion polymerization, the stabilizer system can be incorporated into the latex before or during the drying step.

Thermal stability tests, as hereinafter described, were conducted with polyvinyl chloride obtained by bulk polymerization, polymerizing in suspension or in emulsion, as in a plastisol. Polyvinyl chloride (100 parts by weight), dioctyl phthalate (50 parts by weight), the stabilization system of this invention (1 part by weight), and 0.2 part by weight stearic acid were introduced between mixing rolls turning in opposite directions and heated to a temperature of 130° C. Mixing was continued for 5 minutes after the material had gelled and the mixture was withdrawn as a sheet having a thickness of approximately 1 mm.

Samples taken from the formed sheet were placed between metal platens which are mounted in the press and heated to a temperature of 170° C. under pressure of about 20 kg./cm.² whereby the material is molded intimately to engage the surfaces of the heated platen. Periodic examination is made to observe any change in color. The stabilization effect is indicated by the time in minutes until a black discoloration is observed in the tested samples which is indicative of the degradation of the polymer. For purposes of comparison, tests were included to determine the stabilization effect of the organic compound alone and of zinc oxide alone in corresponding amounts. Where use is made of urea or biuret alone as the organic compound, the time indicated is that at which the samples acquired a yellowish/brown discoloration.

| Stabilization system, percent by weight | | Organic materials (time in minutes) | | | |
|---|---|---|---|---|---|
| Organic material | Zinc oxide | Biurea | Biuret | Urea | Thiourea |
| 100 | 0 | 30 | 60 | 75 | 15 |
| 80 | 20 | 60 | 120 | 105 | 60 |
| 60 | 40 | 135 | 150 | 120 | 60 |
| 40 | 60 | 75 | 105 | 90 | 40 |
| 20 | 80 | 30 | 75 | 75 | 30 |
| 0 | 100 | 15 | 15 | 15 | 15 |

In another series of experiments, thermal stabilization effects were determined using graft polymers of about 50% polyvinyl chloride to which approximately 40% butadiene and 10% acrylonitrile had been grafted, in accordance with the teachings of the French Patent 1,309-809.

100 parts by weight of the graft polymer, 1 part by weight of the stabilization system and 0.3 part by weight of zinc stearate are mixed in a roller mill heated to a temperature of 50° C. Sheeting, sample preparation and testing was carried out in the same manner as that previously described.

The amount of stabilization, expressed in the time span until the appearance of a black discoloration, as a function of the amount of the biuret and zinc oxide in the stabilization system, are set forth in the following table which also includes the data on the stabilization effect in samples formulated by biuret alone and zinc oxide alone.

| Percent by weight | | Time in minutes |
|---|---|---|
| Biuret | Zinc oxide | |
| 0 | 100 | 90 |
| 50 | 50 | 150 |
| 100 | 0 | 90 |

It will be observed from the foregoing that a synergistic effect is obtained by the stabilization system of this invention in that marked improvement in thermal stability is obtained in which the amount of improvement is noticeably greater than that secured by either of the components alone employed within the stabilization system, especially when employed in the preferred ratios.

Beneficial results are secured when the zinc oxide is employed in combination with two or more of the organic compounds, as represented by biurea, biuret, urea and thiourea. Such additional mixtures, forming the stabilization system, are within the purview of this invention and it will be understood that other changes may be made in th details of formulation and use without departing from the spirit of the invention, especially as defined in the following claims.

We claim:

1. A stabilized vinyl chloride based polymer containing as a heat and light stabilizing agent the combination of zinc oxide and an organic compound having the general formula

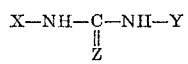

in which Z is selected from the group consisting of oxygen and sulphur, and X and Y are groups selected from the group consisting of hydrogen, —$CONH_2$ and NH—CO—$NH_2$ present in the ratio of 60–20 parts by weight zinc oxide to 40–80 parts by weight of the organic compound.

2. A stabilized polymeric material as claimed in claim 1 in which X and Y are the same.

3. A stabilized polymeric material as claimed in claim 1 in which X and Y are different.

4. A stabilized polymeric material as claimed in claim 1 in which the zinc oxide and organic compound are present in an amount within the range of 0.1% to 2% by weight of the polymeric material.

5. A stabilized polymeric material as claimed in claim 1 in which the organic compound is selected from the group consisting of biurea, biuret, urea and thiourea.

References Cited

UNITED STATES PATENTS

| 2,103,581 | 12/1937 | Gray | 260—45.9 |
| 2,555,167 | 5/1951 | Dij et al. | 260—45.9 |
| 2,864,803 | 12/1958 | Jones | 260—45.8 |
| 2,906,719 | 9/1959 | Jankowiak et al. | 260—45.75 |
| 3,057,831 | 10/1962 | Holdsworth | 260—92.8 |
| 3,125,557 | 3/1964 | Harris | 260—92.8 |
| 3,249,584 | 5/1966 | Gasparis | 260—45.85 |

FOREIGN PATENTS 643,031   7/1964   Belgium.

DONALD E. CZAJA, Primary Examiner

V. P. HOKE, Assistant Examiner

U.S. Cl. X.R.

260—23, 45.9